No. 84,470.  
PATENTED DEC. 1, 1868.  
R. P. BARNETT, C. P. PURINTON & N. SEIBERT.  
ANTIFRICTION BEARING FOR VERTICAL SHAFTS.
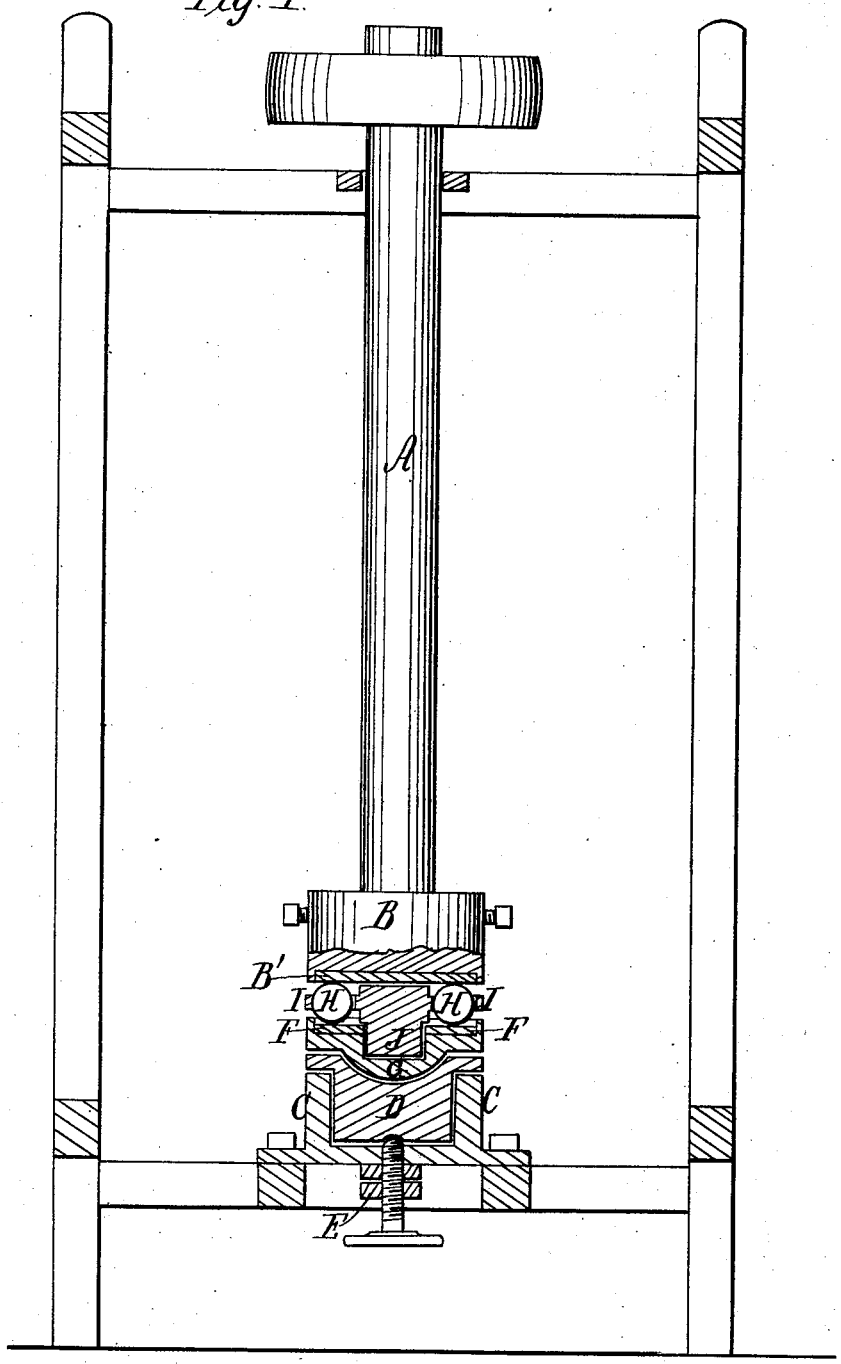
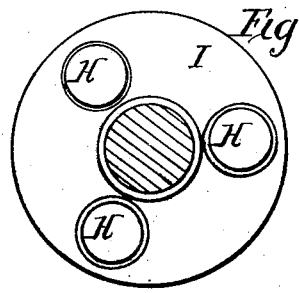

RUFUS P. BARNETT, CHARLES P. PURINTON, AND NICHOLAS SEIBERT, OF NEVADA, CALIFORNIA.

Letters Patent No. 84,470, dated December 1, 1868.

IMPROVEMENT IN ANTI-FRICTION BEARINGS FOR VERTICAL SHAFTS.

The Schedule referred to in these Letters Patent and making part of the same.

*To all whom it may concern:*

Be it known that we, RUFUS P. BARNETT, CHARLES P. PURINTON, and NICHOLAS SEIBERT, of Nevada, county of Nevada, State of California, have invented an Improved Anti-Friction Bearing for Shafts; and we do hereby declare the following description and accompanying drawings are sufficient to enable any person skilled in the art or science to which it most nearly appertains, to make and use our said invention or improvements without further invention or experiment.

The object of our invention is to provide an improved bearing for vertical shafts, and such as ordinarily turn in a step, and which, from their great weight, and the difficulty in properly lubricating them, are liable to frequent disarrangements.

In order to rectify this evil, we form the end of the shaft of sufficient size, and allow it to rest upon three or more hard metallic balls, these balls resting, in turn, upon a self-adjusting plate or table, which is so constructed as to keep them all in contact with the shaft, even when the shaft gets out of line.

To keep the balls always in place, and retain their relative distances from each other in their revolutions, a plate is formed, with openings of sufficient size to allow the balls to turn freely. This plate turns around a central spindle in the adjusting-plate, moving with the balls.

To more fully explain our invention, reference is had to the accompanying drawings, and the letters marked thereon, of which—

Figure 1 is a side sectional elevation of our device.

Figure 2 is a top view of the balls and the guiding-plate.

Similar letters of reference indicate like parts in each of the figures.

A is a vertical shaft, having a base, B, which, if the shaft is small, may be enlarged, so as to give sufficient bearing-surface. In the lower face, B', of this shaft may be placed a steel plate, to reduce the rolling friction, or the end of the shaft may be made entirely of steel.

The base or step C is placed on a foundation, and within the opening is placed a cylindrical block, D, which may be raised or lowered by means of a set-screw, E, so as to keep the shaft in place in case of settling or other change. The upper face of the block D has a concavity in it, as shown.

The plate on which the balls move may be made wholly, or have its upper face, F, of steel, as in the lower face of the shaft. Its lower surface, G, is made convex, so that the whole plate may have a slight motion in any direction, the convexity and concavity forming a universal joint, by which means any change of line or other inequality is accommodated, and the two faces, B' and F, will thus be always kept exactly parallel, so that the bearing will be equal on each of the balls, H H H, which are placed at equal distances from each other, as shown in fig. 2.

To keep them in place, a plate, I, is made, with openings of sufficient size to just admit the largest part of the balls, and allow them to turn freely. This plate has a central shaft or spindle, J, which extends a short distance into the plate on which the balls rest, and thus guides the plate and the balls in their motion, as well as preserves the level of the plate the same at all times with regard to the balls.

The shaft A may be of any necessary height and weight, and have machinery attached to it as desired. Any change, by settling or otherwise, may be easily rectified by the elevating-screw at the bottom, and by the self-operating universal joint.

Having thus described our invention,

What we claim, and desire to secure by Letters Patent, is—

1. In combination with the balls H, and their guide I, the universal joint formed by the convex surface G, and the upper concave surface of D, substantially as described.

2. In combination with the balls H and the above-claimed joint, the screw E, to adjust the same to the required elevation beneath the shaft.

In witness whereof, we have hereunto set our hands and seals.

RUFUS P. BARNETT. [L. S.]
CHARLES P. PURINTON. [L. S.]
NICHOLAS SEIBERT. [L. S.]

Witnesses:
JOHN ANDERSON,
LORING W. WILLIAMS.